(12) United States Patent
Xu et al.

(10) Patent No.: US 12,143,199 B2
(45) Date of Patent: Nov. 12, 2024

(54) MULTI-CARRIER RESOURCE ALLOCATION METHOD BASED ON WIRELESS-POWERED BACKSCATTER COMMUNICATION NETWORK

(71) Applicant: CHONGQING UNIVERSITY OF POSTS AND TELECOMMUNICATIONS, Chongqing (CN)

(72) Inventors: Yongjun Xu, Chongqing (CN); Qianbin Chen, Chongqing (CN); Guoquan Li, Chongqing (CN); Qilie Liu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 342 days.

(21) Appl. No.: 17/261,873

(22) PCT Filed: Mar. 17, 2020

(86) PCT No.: PCT/CN2020/079746
§ 371 (c)(1),
(2) Date: Jan. 21, 2021

(87) PCT Pub. No.: WO2021/128608
PCT Pub. Date: Jul. 1, 2021

(65) Prior Publication Data
US 2022/0407592 A1    Dec. 22, 2022

(30) Foreign Application Priority Data

Dec. 26, 2019   (CN) .......................... 201911368710.9

(51) Int. Cl.
*H04B 7/22*      (2006.01)
*H04W 72/044*    (2023.01)
(Continued)

(52) U.S. Cl.
CPC .......... *H04B 7/22* (2013.01); *H04W 72/0453* (2013.01); *H04W 72/0473* (2013.01); *H04W 72/541* (2023.01)

(58) Field of Classification Search
CPC .............. H04B 7/22; H04B 2001/045; H04W 72/0453; H04W 72/0473; H04W 72/541; H04W 52/386; H04W 72/12; Y02D 30/70
See application file for complete search history.

(56) References Cited

U.S. PATENT DOCUMENTS

2019/0274144 A1*  9/2019  Zhang ............... H04W 52/0203
2022/0070775 A1*  3/2022  Elkotby ............ H04W 52/0229

FOREIGN PATENT DOCUMENTS

WO   WO-2019052625 A1 *  3/2019   ......... G06K 19/0723
WO   WO-2020131907 A1 *  6/2020   ........ H04W 52/0229

* cited by examiner

*Primary Examiner* — Thai Nguyen
(74) *Attorney, Agent, or Firm* — Michael D. Eisenberg

(57) ABSTRACT

The present invention relates to a multi-carrier resource allocation method based on a wireless-powered backscatter communication network. The method comprises following steps: S1. constructing a wireless-powered backscatter communication system; S2: according to circuit power and transmit power constraints, establishing a resource allocation optimization problem taking a maximum total transmission rate of the system as an objective function; S3: according to the objective function and constraint conditions, decomposing an optimization sub-problem taking the transmit power of the backscatter transmitter as a variable; S4: after substituting optimal transmit power of the backscatter transmitter into an original problem, decomposing a (Continued)

sub-problems taking an energy allocation coefficient as a variable from an original optimization problem; S5: converting non-convex problems containing coupling variables into convex problems, creating a Lagrangian function, obtaining an optimal solution form according to a KKT condition, and iteratively updating corresponding variables using a gradient descent method until convergence.

8 Claims, 2 Drawing Sheets

(51) Int. Cl.
    *H04W 72/0453*    (2023.01)
    *H04W 72/541*     (2023.01)

MULTI-CARRIER RESOURCE ALLOCATION METHOD BASED ON WIRELESS-POWERED BACKSCATTER COMMUNICATION NETWORK

TECHNICAL FIELD

The present invention belongs to the technical field of communications, and relates to a multi-carrier resource allocation method based on a wireless-powered backscatter communication network.

BACKGROUND

With the development of communication technology, Internet of Things (IoT) has become a very important emerging technology to improve factory productivity and people's living standards. However, sensor nodes in an Internet of Things system are energy-limited devices, so how to prolong the service life of a network is particularly important. At present, wireless-powered backscatter communication (WPCN) is considered as an effective way to solve this problem. Because environmental backscatter communication allows IoT devices to modulate and reflect radio-frequency signals without generating radio-frequency signals by themselves, and harvest surrounding electromagnetic energy to support circuit power consumption, backscatter communication can reduce the energy consumption of devices and improve the transmission rate of devices.

Most of the existing researches focus on the energy efficiency, throughput and beamforming of backscatter communication, but do not focus on joint optimization of multi-carrier power allocation, time coefficients and backscatter coefficients of the backscatter communication. For a traditional multivariable optimization problem, by using the block coordinate descent method and alternate optimization, only the local optimal value can be obtained, but the global optimal resource allocation policy cannot be obtained, so further research is needed.

SUMMARY

In view of this, the purpose of the present invention is to provide a multi-carrier resource allocation method based on a wireless-powered backscatter communication network to solve the problems of high energy consumption and low transmission rate of a wireless device in the Internet of Things.

To achieve the above purpose, the present invention provides the following technical solution:

A multi-carrier resource allocation method based on a wireless-powered backscatter communication network, comprising following steps:

S1. constructing a wireless-powered backscatter communication system, including a backscatter transmitter, an information receiver and a power station, wherein the backscatter transmitter is provided with an energy harvesting module and a backscatter circuit;

adopting a multi-carrier downlink transmission mode, and dividing the whole transmission process into two stages: in the first stage, the power station transmits radio-frequency signals to the backscatter transmitter, and the backscatter transmitter reflects some signals and converts remaining radio-frequency signals into energy for storage; and in the second stage, the backscatter transmitter uses harvested energy for data transmission and circuit power consumption;

S2: according to circuit power consumption constraints and transmit power constraints, establishing a resource allocation optimization problem taking a maximum total transmission rate of the system as an objective function;

S3: according to the objective function and constraint conditions, decomposing an optimization sub-problem taking transmit power of the backscatter transmitter as a variable;

S4: after substituting optimal transmit power of the backscatter transmitter into an original problem, similarly, decomposing a sub-problem taking an energy allocation coefficient as a variable from an original optimization problem; and S5: converting non-convex problems containing coupling variables into convex problems using a variable substitution method, creating a Lagrangian function using a Lagrange dual method, obtaining an optimal solution form according to a KKT condition, and iteratively updating corresponding variables using a gradient descent method until convergence.

Further, step S1 comprises:

using $T_1$ and $T_2$ to represent time spent in the two stages of the transmission process, $T=T_1+T_2$ representing time required for the whole transmission process; dividing the total system bandwidth B into K orthogonal subcarriers, the bandwidth of each subcarrier being $B_e=B/K$; defining a subcarrier set as $\forall k \in K=\{1, 2, \ldots, K\}$, assuming that each subcarrier experiences flat fading;

in the first stage $T_1$, the signals received by the backscatter transmitter are represented as:

$$y(t) = \sum_{k=1}^{K} \sqrt{p_k h_k}\, s_k(t) + n(t)$$

where $p_k$ represents transmit power allocated by the power station to the backscatter transmitter through subcarrier k, $h_k$ represents the channel power gain from the power station to the backscatter transmitter, $S_k(t)$ represents transmit signals, n(t) represents a background noise and $n(t) \square CN(0,\sigma^2)$;

dividing the signals received by the backscatter transmitter into two parts by a backscatter coefficient $\alpha$, where $\sqrt{\alpha}y(t)$ is used for data backscatter, $\sqrt{1+\alpha}y(t)$ is used for energy harvesting, and in the stage $T_1$, the time used for energy harvesting is represented as $\tau$, $\xi \leq T_1$, and the harvested energy is represented as:

$$E = \tau\eta(1-\alpha)\sum_{k=1}^{K} p_k h_k$$

where $\eta \in [0,1]$ represents an energy harvesting efficiency, and the harvested energy is used to support circuit power consumption and information transmission in the stage $T_2$;

assuming that the energy used for circuit power consumption is $(1-x)E$, the remaining energy $xE$ is used for information transmission, where x represents an energy allocation coefficient, thereby obtaining:

$$(1-x)E \geq p_e T_1 + p_d T_2$$

where $p_e$ and $p_d$ respectively represent the circuit power consumption in the $T_1$ and $T_2$ time periods respectively, that is, the harvested energy used for circuit power consumption must be greater than or equal to the total power consumption of the circuit in the $T_1$ and $T_2$ time periods;

assuming that the backscatter transmitter can decode backscatter signals, defining the background noise power on each subcarrier as $\sigma_k = \sigma^2/K$, so the backscatter data rate from the backscatter transmitter to the information receiver is $$R_b = T_1 \sum_{k=1}^{K} B_e \log_2\left(1 + \frac{\alpha p_k h_k g_k}{\sigma_k}\right)$$

where $g_k$ represents the channel power gain from the backscatter transmitter to the information receiver, $B_e$ represents the bandwidth of each subcarrier, defining the transmit power of the backscatter transmitter on each subcarrier as $P_k$ in the stage $T_2$, so the data rate of each subcarrier is $$R_k^h = B_e \kappa T_2 \log_2\left(1 + \frac{P_k g_k}{\sigma_k}\right)$$

where $\kappa \in [0,1]$ represents the transmission efficiency.

Further, in step S2, in order to improve the transmission efficiency of the entire system, a maximum total transmission rate of the information receiver is obtained by jointly optimizing the transmit power, the time allocation and the backscatter coefficient, and the resource allocation optimization problem is established as:

$$\max_{T_1, T_2, p_k, P_k, x, \tau, \alpha} R$$

s.t. C1: $(1-x)\tau\eta(1-\alpha)P_s \geq p_e T_1 + p_d T_2$,

C2: $T_2 \sum_{k=1}^{K} P_k \leq x\tau\eta(1-\alpha)P_s$,

C3: $T_1 + T_2 = T$,

C4: $\sum_{k=1}^{K} p_k \leq P^{max}$,

C5: $\tau \leq T_1$,

C6: $0 \leq \alpha \leq 1$,

C7: $0 \leq x \leq 1$,

C8: $p_k \geq 0, P_k \geq 0, T_1 \geq 0, T_2 \geq 0, \tau \geq 0$.

where $P^{max}$ represents the maximum transmit power of the power station, $$P_s = \sum_{k=1}^{K} p_k h_k$$

represents the total power of the signals received by the backscatter transmitter, $$R = R_b + \sum_{k=1}^{K} R_k^h$$

represents the total data rate, C1 represents the minimum circuit power consumption constraint, C2 represents the maximum transmit power constraint of the backscatter transmitter in the stage $T_2$, and C4 represents the maximum transmit power constraint of the power station.

Further, in step S3, the transmit power $P_k$ of the backscatter transmitter is only restricted by C2, and an optimization sub-problem is decomposed and solved by using a water-filling algorithm, so the optimal $P_k^*$ is found first and is substituted into the optimization problem;

consider the unit bandwidth over each subcarrier, an optimization sub-problem of the transmit power of the backscatter transmitter is written as:

$$\max_{P_k} T_2 \kappa \sum_{k=1}^{K} \log_2\left(1 + \frac{P_k g_k}{\sigma_k}\right)$$

s.t. C2: $T_2 \sum_{k=1}^{K} P_k \leq x\tau\eta(1-\alpha)P_s$.

the above problem is a convex optimization problem since the constraint condition is linear constraint and the objective function is a concave function; $\bar{g}_k = \sigma_k/g_k$ is defined, and the optimal transmit power obtained by using the water-filling algorithm is $$P_k = \left[\frac{1}{\lambda \ln 2 T_2} - \bar{g}_k\right]^+$$

where $[x]^+ = \max(0, x)$, $\lambda$ represents a Lagrange multiplier, and $\lambda$ satisfies the following formula:

$$T_2 \sum_{k=1}^{K}\left(\frac{1}{\lambda \ln 2 T_2} - \bar{g}_k\right) = x\tau\eta(1-\alpha)P_s$$

$$\lambda = \frac{K}{\ln 2\left(T_2 \sum_{k=1}^{K} \bar{g}_k + x\tau\eta(1-\alpha)P_s\right)}$$

is obtained, and the transmit power $P_k$ is substituted, thus obtaining an optimal power allocation policy in the stage $T_2$:

$$P_k^* = \frac{\sum_{k=1}^{K} \bar{g}_k}{K} + \frac{x\tau\eta(1-\alpha)P_s}{KT_2} - \bar{g}_k$$

if more harvested energy is used for data transmission, the transmit power $P^*_k$ may be greater, and the total data rate may be greater; if the transmit power $p_k$ of the power station becomes larger, $P^*_k$ also becomes larger; and since the backscatter transmitter has no energy storage device, the transmission rate is limited by the energy node (power station).

Further, in step S4, $P^*_k$ is substituted into the original optimization problem, and an optimization sub-problem with an energy coefficient is decomposed:

$$\max_x T_1 \sum_{k=1}^{K} \log_2\left(1 + \frac{\alpha p_k h_d}{\overline{g}_k}\right) + T_2 \kappa \sum_{k=1}^{K} \log_2\left(\overline{K} + \frac{x\tau\eta(1-\alpha)P_s g_k}{\overline{g}_k K T_2}\right)$$

s.t. C1: $(1-x)\tau\eta(1-\alpha)P_s \geq p_e T_1 + p_d T_2$,

C7: $0 \leq x \leq 1$, where $$\overline{K} = \left(\sum_{j=1}^{K} g_j / g_k\right)$$

represents a constant, because the objective function of the above optimization sub-problem is a monotonically increasing function about the energy allocation coefficient x, according to the constraints C1 and C7, the value of x is $$x = \max\left(1, 1 - \frac{p_e T_1 + p_d T_2}{\tau\eta(1-\alpha)P_s}\right);$$

because the right side of the inequality of the constraint C1 is greater than zero, if x=1, the constraint condition is not satisfied, so the optimal energy allocation coefficient is $$x^* = 1 - \frac{p_e T_1 + p_d T_2}{\tau\eta(1-\alpha)P_s};$$

and because $x \geq 0$, the backscatter coefficient $\alpha$ must satisfy $$\alpha \leq 1 - \frac{p_e T_1 + p_d T_2}{\tau\eta P_s};$$

similarly, the optimal energy harvesting time $\tau^* = T_1 = T - T_2$ is obtained by using the same method.

Further, in step S5, $x^*$ and $\tau^*$ are substituted into the original optimization problem, thus obtaining the following time and power allocation optimization problem:

$$\max_{T_1, T_2, p_k, \alpha, l_k} T_1 \sum_{k=1}^{K} \log_2\left(1 + \frac{\alpha p_k h_k}{\overline{g}_k}\right) + T_2 \kappa \sum_{k=1}^{K} \log_2\left(\overline{K} + l_k\right)$$

s.t. C4: $\sum_{k=1}^{K} p_k \leq P^{max}$,

-continued

C9: $0 \leq \alpha \leq 1 - B/A$,

C10: $\frac{A(1-\alpha) - B}{\overline{g}_k K T_2} \geq l_k$.

where $$l_k = \frac{x\tau\eta(1-\alpha)P_s}{\overline{g}_k K T_2}, l_k > 0$$

is an auxiliary variable, which represents a lower bound of the second term of the objective function, $A = T_1\eta P_s$ represents an auxiliary variable; and $B = p_e T_1 + p_d T_2$ represents the total circuit power consumption.

Further, $$\alpha \leq 1 - \frac{B + \overline{g}_k K T_2 l_k}{A}$$

is obtained according to the constraint C10, so C9 and C10 are combined into one constraint;

the variable substitution $L_k = T_2 l_k$, $\overline{p}_k = \alpha p_k$, $\tilde{p}_k = T_1 \overline{p}_k$, $\hat{p} = T_1 p_k$ is defined, substituted into the time and power allocation optimization problem, and converted into a convex optimization problem:

$$\max_{L_k, T_1, T_2, \tilde{p}_k, \hat{p}_k} T_1 \sum_{k=1}^{K} \log_2\left(1 + \frac{\tilde{p}_k h_k}{\overline{g}_k T_1}\right) + T_2 \kappa \sum_{k=1}^{K} \log_2\left(\overline{K} + \frac{L_k}{T_2}\right)$$

s.t. C4: $\sum_{k=1}^{K} \hat{p}_k \leq T_1 P^{max}$,

C10: $\eta \sum_{k=1}^{K} \hat{p}_k h_k - \eta \sum_{k=1}^{K} \tilde{p}_k h_k \geq L_k \overline{g}_k K + p_e T_1 + p_d T_2$.

Further, according to the described time and power allocation optimization problem, a Lagrangian function is created using a Lagrange dual method:

$$L(\{L_k\}, T_1, T_2, \{\tilde{p}_k\}, \{\hat{p}_k\}, \lambda, \{\beta_k\}) =$$

$$T_1 \sum_{k=1}^{K} \log_2\left(1 + \frac{\tilde{p}_k h_k}{\overline{g}_k T_1}\right) + T_2 \kappa \sum_{k=1}^{K} \log_2\left(\overline{K} + \frac{L_k}{T_2}\right) + \lambda\left(T_1 P^{max} - \sum_{k=1}^{K} \hat{p}_k\right) +$$

$$\sum_{k=1}^{K} \beta_k \left(\eta \sum_{k=1}^{K} \hat{p}_k h_k - \eta \sum_{k=1}^{K} \tilde{p}_k h_k - L_k \overline{g}_k K\right) - \sum_{k=1}^{K} \beta_k (T_2 p_d + T_1 p_e)$$

where $\beta_k$ and $\lambda$ represent non-negative Lagrange multipliers of corresponding constraints; the Lagrange function is rewritten as:

$$L(\{L_k\}, T_1, T_2, \{\tilde{p}_k\}, \{\hat{p}_k\}, \lambda\{\beta_k\}) =$$

$$\sum_{k=1}^{K} L_k(\{L_k\}, T_1, T_2, \{\tilde{p}_k\}, \{\hat{p}_k\}, \lambda\{\beta_k\}) \text{ where}$$

$$L_k(\{L_k\}, T_1, T_2, \{\tilde{p}_k\}, \{\hat{p}_k\}, \lambda\{\beta_k\}) =$$

-continued $$T_1\log_2\left(1+\frac{\hat{p}_k h_k}{\overline{g}_k T_1}\right) + T_2\kappa\log_2\left(\overline{K}+\frac{L_k}{T_2}\right) - \lambda \hat{p}_k -$$

$$\beta_k(T_2 p_d + T_1 p_e) + \beta_k\left(\eta\sum_{k=1}^{K}\hat{p}_k h_k - \eta\sum_{k=1}^{K}\hat{p}_k h_k - L_k\overline{g}_k K\right) + \frac{\lambda T_1 P^{max}}{K}$$

according to the Karush-kuhn-Tucker condition, the optimal solutions are $$\hat{p}_k^* = T_1\left[\frac{1}{\ln 2\beta_k\eta h_k} - \frac{\overline{g}_k}{h_k}\right]^+, L_k^* = T_2\left[\frac{\kappa}{\ln 2\beta_k\overline{g}_k K} - \overline{K}\right],$$

where $[x]^+ = \max(0,x)$; $\tilde{p}^*_k$ and $L^*_k$ are substituted into the above Lagrange function, obtaining:

$$\overline{L}_k(T_2, \{\hat{p}_k\}, \lambda\{\beta_k\}) = -(T-T_2)\log_2(\ln 2\eta\beta_k\overline{g}_k) +$$

$$T_2\kappa\log_2\left(\frac{\kappa}{\ln 2\beta_k\overline{g}_k K}\right) - \lambda\hat{p}_k - \beta_k(T_2 p_d + (T-T_2)p_e) + \frac{\lambda(T-T_2)P^{max}}{K} -$$

$$(T-T_2)\left(\frac{K}{\ln 2} - \eta\sum_{k=1}^{K}\beta_k\overline{g}_k\right) - \frac{T_2\kappa}{\ln 2} + T_2\beta_k\overline{g}_k K\overline{K} + \beta_k\eta\sum_{k=1}^{K}\hat{p}_k h_k$$

based on the gradient descent method, the parameters are iteratively updated, including $$T_2(t+1) = \left[T_2(t) - \Delta_T \times \frac{\partial \overline{L}_k}{\partial T_2}\right]^+, T_1(t) = T - T_2(t) \text{ and}$$

$$\hat{p}_k(t+1) = \left[p_k(t) - \Delta_p \times \frac{\partial \overline{L}_k}{\partial T_2}\right]^+, \text{ where } \frac{\partial \overline{L}_k}{\partial \hat{p}_k} = \beta_k\eta h_k - \lambda$$

$$\frac{\partial \overline{L}_k}{\partial T_2} = \log_2(\ln 2\eta\beta_k\overline{g}_k) + \kappa\log_2\left(\frac{\kappa}{K\ln 2\beta_k\overline{g}_k}\right) -$$

$$\beta_k p_d + \beta_k p_e - \frac{\lambda P^{max}}{K} - \frac{\kappa}{\ln 2} + \beta_k K\overline{K}\overline{g}_k + \frac{K}{\ln 2} - \eta\sum_{k=1}^{K}\beta_k\overline{g}_k \; t$$

represents iteration times, and $\Delta_p$ and $\Delta_T$ represent corresponding iteration step sizes; similarly, Lagrange multipliers $\beta_k$ and $\lambda$ are updated by using the same method until convergence; according to the relationship between variables defined by variable substitution, the optimal value $$\alpha^* = \frac{\tilde{p}_k^*}{\hat{p}_k^*}$$

of the backscatter coefficient and the optimal power allocation policy $$p_k^* = \frac{\hat{p}_k^*}{T_1^*\alpha^*}$$

from the power station to the backscatter transmitter are solved; and $p^*_k$, $\alpha^*$, $T^*_1$, $T^*_2$ and $\tau^*$ are substituted into the previous derivation of the energy allocation coefficient and the transmit power of the backscatter transmitter to obtain $x^*$ and $P^*_k$.

The present invention has the beneficial effects that a new backscatter communication system structure is established: in a wireless-powered backscatter communication system, a power station transmits signals to a backscatter transmitter having the functions of backscatter communication and energy harvesting. The time resource block is divided into two parts: in the first stage, the power station transmits radio-frequency signals to the backscatter transmitter, and the backscatter transmitter reflects some signals and harvests energy from the remaining signals; and in the second stage, the backscatter transmitter decodes the reflected signals and uses harvested energy for data transmission and circuit power consumption. By establishing an optimization problem of the maximum total transmission rate, the optimal values of power allocation, time coefficient, backscatter coefficient, energy allocation coefficient and other variables of the power station on all subcarriers are obtained.

Other advantages, objectives, and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF DRAWINGS

To enable the purpose, the technical solution, and the advantages of the present invention to be more clear, the present invention will be preferably described in detail below in combination with the drawings, wherein.

DETAILED DESCRIPTION

Figure 1:
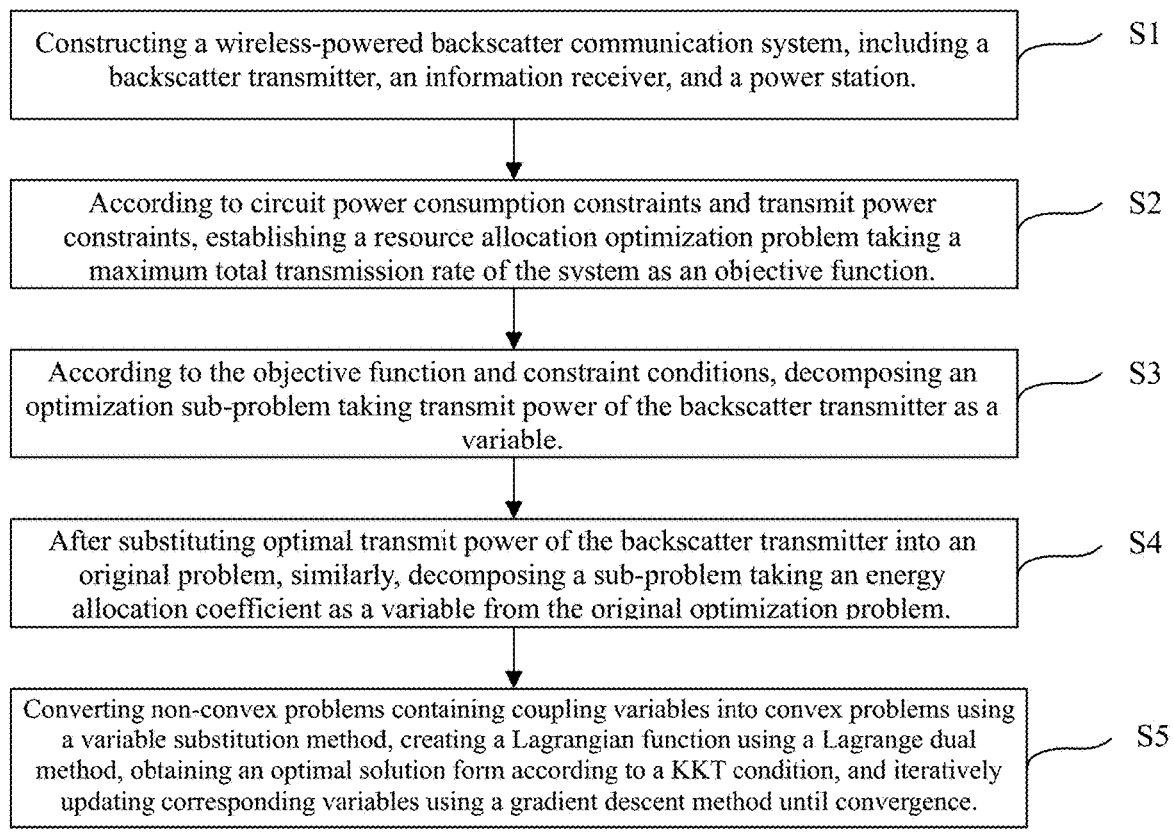
FIG. 1 is a flow diagram of the multi-carrier resource allocation method based on a wireless-powered backscatter communication network according to the present invention.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference signs in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

Figure 2:
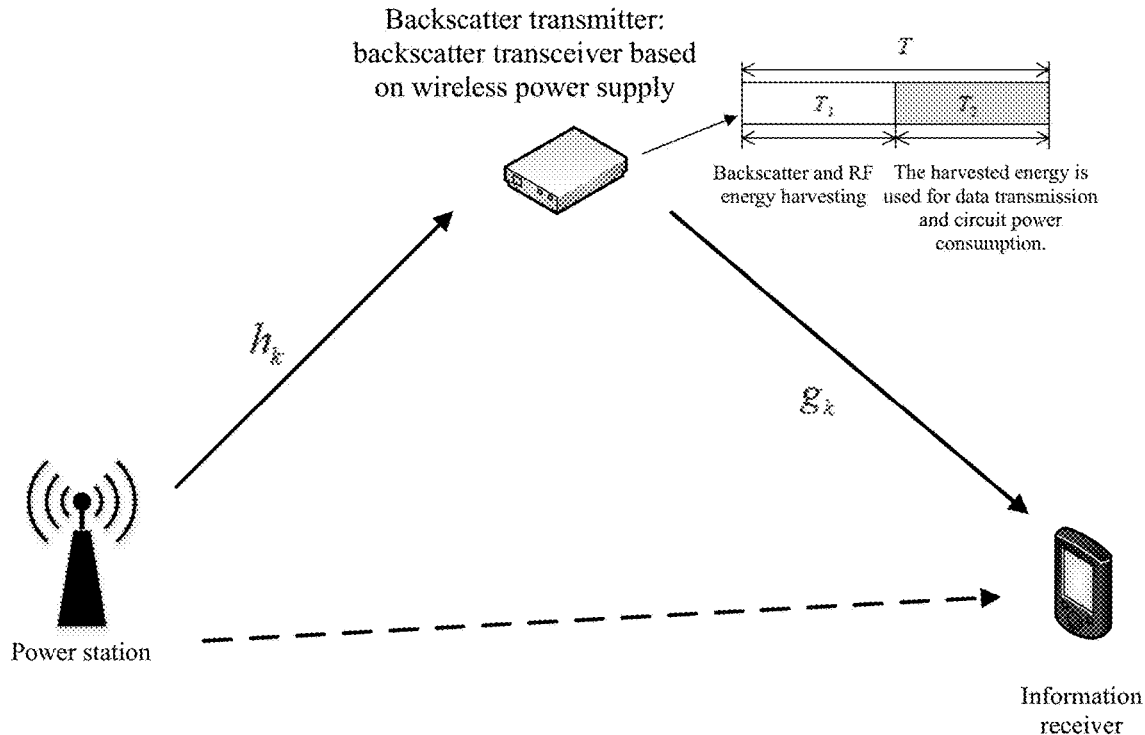
FIG. 2 is a schematic diagram of the system model of the present invention.

As shown in FIG. 1, the resource allocation method based on a wireless-powered backscatter communication network provided by the present invention comprises following steps:

Step 1, as shown in FIG. 2, constructing a wireless-powered backscatter communication system, including a backscatter transmitter, an information receiver, and a power station, wherein the backscatter transmitter is equipped with an energy harvesting module and a backscatter circuit. Adopting a multi-carrier downlink transmit mode in order to improve the data transmission rate, and dividing the whole transmission process into two stages: in the first stage, the power station transmits radio-frequency signals to the backscatter transmitter, and the backscatter transmitter reflects some signals and converts remaining radio-frequency signals into energy for storage; and in the second stage, the backscatter transmitter decodes the reflected signals and uses harvested energy for data transmission and circuit power consumption.

Step 2: constructing an optimization model with the maximum total transmission rate, decomposing the complex optimization problem into multiple sub-problems, and finally converting the non-convex problems containing coupling variables into convex problems through variable substitution.

Step 3: jointly optimizing the transmit power, transmission time, backscatter coefficient and energy allocation coefficient by using the water-filling algorithm and the gradient descent method to obtain an optimal resource allocation policy.

The optimization process for solving resource allocation includes:

1) Based on the minimum power consumption constraint and maximum transmit power constraint of a circuit, in consideration of the value range of power allocation, time coefficient, backscatter coefficient, and energy allocation coefficient, establishing an optimization problem taking a maximum total transmission rate of the system as an objective function.

2) Decomposing an optimization sub-problem taking transmit power of the backscatter transmitter as an optimization variable from the original optimization problem, wherein the transmit power of the backscatter transmitter is limited by the energy obtained in the energy harvesting process, and obtaining the optimal value of the transmit power of the scattering transmitter by using the water-filling algorithm.

3) Decomposing an optimization sub-problem taking the energy allocation coefficient of the backscatter transmitter as an optimization variable from the original optimization problem, wherein the backscatter transmitter uses a part of the harvested energy for circuit power consumption and the other part for data transmission; and obtaining the optimal values of the energy allocation coefficient and energy harvesting time.

To better understand the resource allocation method based on a wireless-powered backscatter communication network provided by embodiments of the present invention, the embodiments of the present invention will be described in detail. The method specifically comprises following steps:

S1. Constructing a wireless-powered backscatter communication system, i.e. a backscatter communication system including a backscatter transmitter, an information receiver, and a power station. Dividing the whole transmission process into two stages: in the first stage, the power station transmits radio-frequency signals to the backscatter transmitter, and the backscatter transmitter reflects some signals and harvests energy from the remaining signals; and in the second stage, the backscatter transmitter uses harvested energy for data transmission and circuit power consumption.

Using $T_1$ and $T_2$ to represent time spent in the two stages of the transmission process, $T=T_1+T_2$ presenting the time required for the whole transmission process. Dividing the total system bandwidth B into K orthogonal subcarriers, so the bandwidth of each subcarrier is $B_e=B/K$. Defining a subcarrier set as $\forall k \in K=\{1, 2, \ldots, K\}$, assuming that each subcarrier experiences flat fading. Since the power station is far away from the information receiver, the interference therebetween is ignored.

In the first stage $T_1$, the signals received by the backscatter transmitter are represented as $$y(t) = \sum_{k=1}^{K} \sqrt{p_k h_k}\, s_k(t) + n(t),$$

where $p_k$ represents transmit power allocated by the power station to the backscatter transmitter through subcarrier k, $h_k$ represents the channel power gain from the power station to the backscatter transmitter, $s_k(t)$ represents a transmit signals, $n(t)$ represents a background noise and $n(t) \square CN(0,\sigma^2)$.

Dividing the signals received by the backscatter transmitter into two parts by a backscatter coefficient $\alpha$, where $\sqrt{\alpha}y(t)$ is used for data backscatter, and $\sqrt{1-\alpha}y(t)$ is used for energy harvesting; and in the stage $T_1$, due to the limitation of the battery capacity of the backscatter transmitter, the time used for energy harvesting is represented as $\tau$, $\tau \leq T_1$. Therefore, the harvested energy is represented as:

$$E = \tau \eta (1-\alpha) \sum_{k=1}^{K} p_k h_k$$

where $\eta \in [0,1]$ represents an energy harvesting efficiency.

The harvested energy is used to support circuit power consumption and information transmission in the stage $T_2$. Assuming that the energy used for circuit power consumption is $(1-x)E$, the remaining energy $xE$ is used for information transmission, where x represents an energy allocation coefficient, thereby obtaining:

$$(1-x)E \geq p_e T_1 + p_d T_2$$

where $p_e$ and $p_d$ respectively represent the circuit power consumption in the $T_1$ and $T_2$ time periods respectively, that is, the harvested energy used for circuit power consumption must be greater than or equal to the total power consumption of the circuit in the $T_1$ and $T_2$ periods.

Assuming that the backscatter transmitter can decode backscatter signals, defining the background noise power on each subcarrier as $\sigma_k = \sigma^2/K$, so the backscatter data rate from the backscatter transmitter to the information receiver is $$R_b = T_1 \sum_{k=1}^{K} B_k \log_2\left(1 + \frac{\alpha p_k h_k g_k}{\sigma_k}\right)$$

where $g_k$ represents a channel power gain from the backscatter transmitter to the information receiver, $B_e$ represents the bandwidth of each subcarrier, defining the transmit power of the backscatter transmitter on each subcarrier as $P_k$ in the stage $T_2$, so the data rate of each subcarrier is $$R_k^h = B_e \kappa T_2 \log_2\left(1 + \frac{P_k g_k}{\sigma_k}\right)$$

where $\kappa \in [0,1]$ represents the transmission efficiency.

S2: According to circuit power consumption constraints and transmit power constraints, establishing a resource allocation optimization problem taking a maximum total transmission rate of the system as an objective function.

In order to improve the transmission efficiency of the entire system, a maximum total transmission rate of the information receiver is obtained by jointly optimizing the transmit power, the time allocation and the backscatter coefficient, and the resource allocation optimization problem is established as:

$$\max_{T_1, T_2, p_k, P_k, x, \tau, \alpha} R$$

s.t. C1: $(1-x)\tau\eta(1-\alpha)P_s \geq p_e T_1 + p_d T_2$,

C2: $T_2 \sum_{k=1}^{K} P_k \leq x\tau\eta(1-\alpha)P_s$,

C3: $T_1 + T_2 = T$,

C4: $\sum_{k=1}^{K} p_k \leq P^{max}$,

C5: $\tau \leq T_1$,

C6: $0 \leq \alpha \leq 1$,

C7: $0 \leq x \leq 1$,

C8: $p_k \geq 0, P_k \geq 0, T_1 \geq 0, T_2 \geq 0, \tau \geq 0$.

where $P^{max}$ represents the maximum transmit power of the power station, $$P_s = \sum_{k=1}^{K} p_k h_k$$

represents the total power of the signals received by the backscatter transmitter, $$R = R_b + \sum_{k=1}^{K} R_k^h$$

represents the total data rate, C1 represents the minimum circuit power consumption constraint, C2 represents the maximum transmit power constraint of the backscatter transmitter in the stage $T_2$, and C4 represents the maximum transmit power constraint of the power station.

S3: According to the objective function and constraint conditions, decomposing an optimization sub-problem taking transmit power of the backscatter transmitter as a variable.

In order to find a closed form solution, according to the above optimization problem, it is observed that the transmit power $P_k$ of the backscatter transmitter is only restricted by C2, and an optimization sub-problem is decomposed and solved by using a water-filling algorithm, so the optimal $P^*_k$ is found first and substituted into the optimization problem.

Consider the unit bandwidth over each subcarrier, an optimization sub-problem of the transmit power of the backscatter transmitter may be written as:

$$\max_{P_k} T_2 \kappa \sum_{k=1}^{K} \log_2\left(1 + \frac{P_k g_k}{\sigma_k}\right)$$

s.t. C2: $T_2 \sum_{k=1}^{K} P_k \leq x\tau\eta(1-\alpha)P_s$.

The above problem is a convex optimization problem since the constraint condition is linear constraint and the objective function is a concave function. $\bar{g}_k = \sigma_k/g_k$ is defined, and the optimal transmit power obtained by using the water-filling algorithm is $$P_k = \left[\frac{1}{\lambda \ln 2 T_2} - \bar{g}_k\right]^+$$

where $[x]^+ = \max(0,x)$, $\lambda$ is a Lagrange multiplier, and $\lambda$ satisfies the following formula:

$$T_2 \sum_{k=1}^{K} \left(\frac{1}{\lambda \ln 2 T_2} - \bar{g}_k\right) = x\tau\eta(1-\alpha)P_s$$

$$\lambda = \frac{K}{\ln 2 \left(T_2 \sum_{k=1}^{K} \bar{g}_k + x\tau\eta(1-\alpha)P_s\right)}$$

is obtained, and the transmit power $P_k$ is substituted, thus obtaining an optimal power allocation policy in the stage $T_2$:

$$P_k^* = \frac{\sum_{k=1}^{K} \bar{g}_k}{K} + \frac{x\tau\eta(1-\alpha)P_s}{KT_2} - \bar{g}_k$$

If more harvested energy is used for data transmission, the transmit power $P^*_k$ may be greater, and the total data rate may be greater. If the transmit power $p_k$ of the power station becomes larger, $P^*_k$ also becomes larger. Since the backscatter transmitter has no energy storage device, the transmission rate is limited by the energy node (power station).

S4: Substituting optimal transmit power of the backscatter transmitter into an original problem, and similarly, decomposing a sub-problem taking an energy allocation coefficient as a variable from an original optimization problem.

$P^*_k$ is substituted into the original optimization problem, and an optimization sub-problem with an energy coefficient is decomposed:

$$\max_x T_1 \sum_{k=1}^{K} \log_2\left(1 + \frac{\alpha p_k h_k}{\bar{g}_k}\right) + T_2 \kappa \sum_{k=1}^{K} \log_2\left(K + \frac{x \tau \eta (1-\alpha) P_s g_k}{\bar{g}_k K T_2}\right)$$

s.t. C1: $(1-x)\tau\eta(1-\alpha)P_s \geq p_e T_1 + p_d T_2$,

C7: $0 \leq x \leq 1$.

where $\bar{K} = \left(\sum_{j=1}^{K} g_j / g_k\right)$ represents a constant, because the objective function of the above optimization sub-problem is a monotonically increasing function about the energy allocation coefficient x, according to the constraints C1 and C7, the value of x is $$x = \max\left(1, 1 - \frac{p_e T_1 + p_d T_2}{\tau\eta(1-\alpha)P_s}\right).$$

Because the right side of the inequality of the constraint C1 is greater than zero, if x=1, the constraint condition is not satisfied, so the optimal energy allocation coefficient is $$x^* = 1 - \frac{p_e T_1 + p_d T_2}{\tau\eta(1-\alpha)P_s};$$

and because x≥0, the backscatter coefficient α must satisfy $$\alpha \leq 1 - \frac{p_e T_1 + p_d T_2}{\tau\eta P_s}.$$

Similarly, the optimal energy harvesting time $\tau^* = T_1 = T - T_2$ may be obtained by using the same method.

S5: Converting non-convex problems containing coupling variables into convex problems using a variable substitution method, creating a Lagrangian function using a Lagrange dual method, obtaining an optimal solution form according to a KKT condition, and iteratively updating corresponding variables using a gradient descent method until convergence.

$x^*$ and $\tau^*$ are substituted into the original optimization problem, thus obtaining the following time and power allocation optimization problem:

$$\max_{T_1, T_2, p_k, \alpha, l_k} T_1 \sum_{k=1}^{K} \log_2\left(1 + \frac{\alpha p_k h_k}{\bar{g}_k}\right) + T_2 \kappa \sum_{k=1}^{K} \log_2(\bar{K} + l_k)$$

s.t. C4: $\sum_{k=1}^{K} p_k \leq P^{max}$,

C9: $0 \leq \alpha \leq 1 - B/A$,

C10: $\frac{A(1-\alpha) - B}{\bar{g}_k K T_2} \geq l_k$.

where $l_k > 0$ is an auxiliary variable, which represents a lower bound of the second term of the objective function, $A = T_1 \eta_s$ represents an auxiliary variable; and $B = p_e T_1 + p_d T_2$ represents the total circuit power consumption.

$$\alpha \leq 1 - \frac{B + \bar{g}_k K T_2 l_k}{A}$$

can be obtained according to the constraint C10, so C9 and C10 can be combined into one constraint.

The variable substitution $L_k = T_2 l_k$, $\bar{p}_k = \alpha p_k$, $\tilde{p}_k = T_1 \bar{p}_k$, $\hat{p}_k = T_1 p_k$ is defined, substituted into the time and power allocation optimization problem, and converted into a convex optimization problem:

$$\max_{L_k, T_1, T_2, \tilde{p}_k, \hat{p}_k} T_1 \sum_{k=1}^{K} \log_2\left(1 + \frac{\tilde{p}_k h_k}{\bar{g}_k T_1}\right) + T_2 \kappa \sum_{k=1}^{K} \log_2\left(\bar{K} + \frac{L_k}{T_2}\right)$$

s.t. C4: $\sum_{k=1}^{K} \hat{p}_k \leq T_1 P^{max}$,

C10: $\eta \sum_{k=1}^{K} \hat{p}_k h_k - \eta \sum_{k=1}^{K} \tilde{p}_k h_k \geq L_k \bar{g}_k K + p_e T_1 + p_d T_2$.

A Lagrangian function is created using a Lagrange dual method:

$$L(\{L_k\}, T_1, T_2, \{\tilde{p}_k\}, \{\hat{p}_k\}, \lambda, \{\beta_k\}) =$$

$$T_1 \sum_{k=1}^{K} \log_2\left(1 + \frac{\tilde{p}_k h_k}{\bar{g}_k T_1}\right) + T_2 \kappa \sum_{k=1}^{K} \log_2\left(\bar{K} + \frac{L_k}{T_2}\right) + \lambda\left(T_1 P^{max} - \sum_{k=1}^{K} \hat{p}_k\right) +$$

$$\sum_{k=1}^{K} \beta_k \left(\eta \sum_{k=1}^{K} \hat{p}_k h_k - \eta \sum_{k=1}^{K} \tilde{p}_k h_k - L_k \bar{g}_k K\right) - \sum_{k=1}^{K} \beta_k (T_2 p_d + T_1 p_e)$$

where $\beta_x$ and $\lambda$ represent non-negative Lagrange multipliers of corresponding constraints.

According to the Karush-kuhn-Tucker condition, the optimal solutions are $$\tilde{p}_k^* = T_1\left[\frac{1}{\ln 2 \beta_k \eta h_k} - \frac{\bar{g}_k}{h_k}\right]^+, L_k^* = T_2\left[\frac{\kappa}{\ln 2 \beta_k \bar{g}_k K} - \bar{K}\right],$$

where $[x]^+=\max(0, x)$. $\tilde{p}^*_k$ and $L^*_k$ are substituted into the above Lagrange function, obtaining:

$$\overline{L}_k(T_2, \{\hat{p}_k\}, \lambda, \{\beta_k\}) = -(T - T_2)\log_2(\ln 2\eta\beta_k\overline{g}_k) +$$

$$T_2\kappa\log_2\left(\frac{\kappa}{\ln 2\beta_k\overline{g}_kK}\right) - \lambda\hat{p}_k - \beta_k(T_2p_d + (T - T_2)p_e) + \frac{\lambda(T - T_2)P^{max}}{K} -$$

$$(T - T_2)\left(\frac{K}{\ln 2} - \eta\sum_{k=1}^{K}\beta_k\overline{g}_k\right) - \frac{T_2\kappa}{\ln 2} + T_2\beta_k\overline{g}_kK\overline{K} + \beta_k\eta\sum_{k=1}^{K}\hat{p}_kh_k$$

Based on the gradient descent method, the parameters are iteratively updated, including $$T_2(t+1) = \left[T_2(t) - \Delta_T \times \frac{\partial \overline{L}_k}{\partial T_2}\right]^+, T_1(t) = T - T_2(t) \text{ and}$$

$$\hat{p}_k(t+1) = \left[\hat{p}_k(t) - \Delta_p \times \frac{\partial \overline{L}_k}{\partial \hat{p}_k}\right]^+, \text{ where}$$

$$\frac{\partial \overline{L}_k}{\partial \hat{p}_k} = \beta_k\eta h_k - \lambda,$$

$$\frac{\partial \overline{L}_k}{\partial T_2} = \log_2(\ln 2\eta\beta_k\overline{g}_k) + \kappa\log_2\left(\frac{\kappa}{K\ln 2\beta_k\overline{g}_k}\right) -$$

$$\beta_k p_d + \beta_k p_e - \frac{\lambda P^{max}}{K} - \frac{\kappa}{\ln 2} + \beta_k K\overline{K}\overline{g}_k + \frac{K}{\ln 2} - \eta\sum_{k=1}^{K}\beta_k\overline{g}_k \ t$$

represents iteration times, and $\Delta_p$ and $\Delta_T$ represent corresponding iteration step sizes. Similarly, Lagrange multipliers $\beta_k$ and $\lambda$ are updated by using the same method until convergence. According to the relationship between variables defined by variable substitution, the optimal value $$\alpha^* = \frac{\tilde{p}^*_k}{\hat{p}^*_k}$$

of the backscatter coefficient and the optimal power allocation policy $$p^*_k = \frac{\hat{p}^*_k}{T^*_1\alpha^*}$$

from the power station to the backscatter transmitter are solved. $p^*_k$, $\alpha^*$, $T^*_1$, $T^*_2$ and $\tau^*$ are substituted into the previous derivation of the energy allocation coefficient and the transmit power of the backscatter transmitter to obtain $x^*$ and $P^*_k$.

Figure 3:
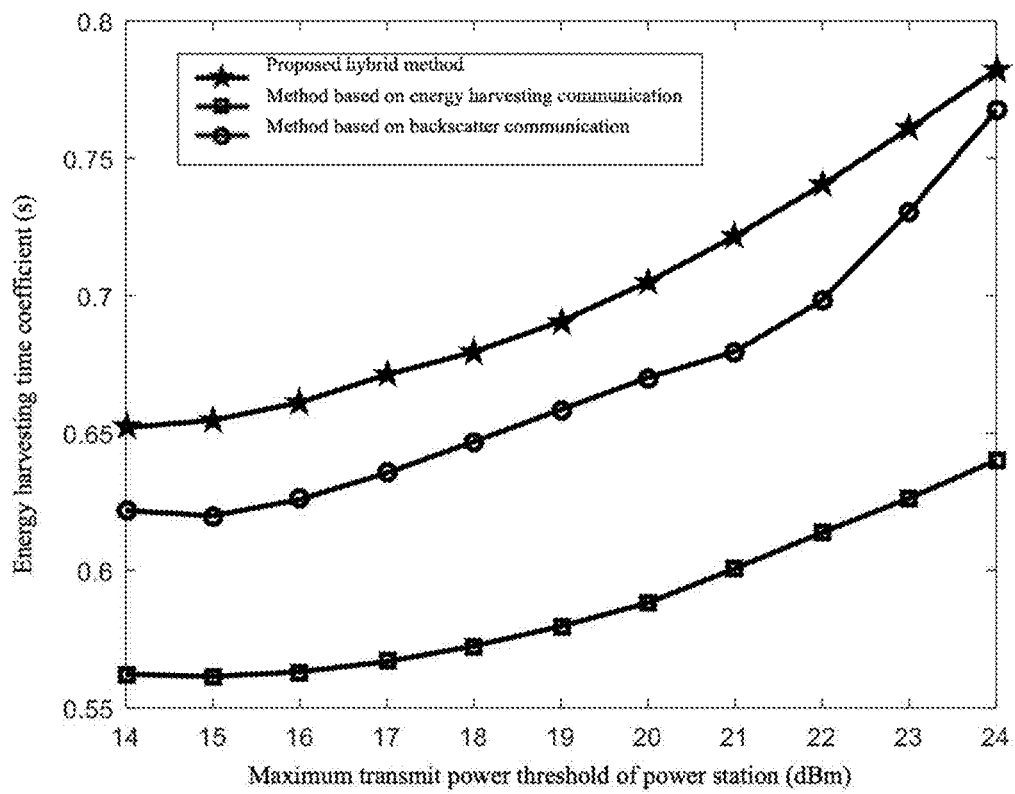
FIG. 3 is a curve chart showing the relationship between the energy harvesting time coefficient and the maximum transmit power threshold of the power station under different algorithms.
Figure 4:
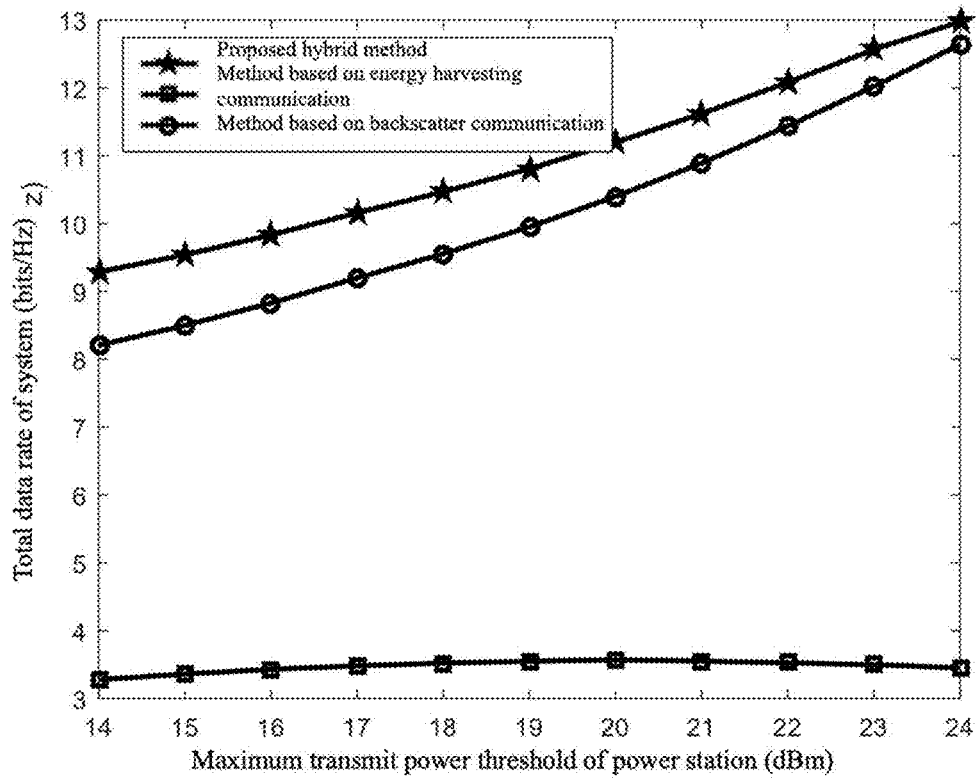
FIG. 4 is a curve chart showing the relationship between the total data rate and the maximum transmit power threshold of the power station under different algorithms.

The performance of the system based on a wireless-powered backscatter communication network proposed in this embodiment is shown in FIGS. 3 and 4. The hybrid method proposed by the present invention is compared with backscatter communication (x=0) and energy harvesting communication ($\alpha$=0).

FIG. 3 depicts a curve chart showing the relationship between the time coefficient in the energy harvesting stage and the maximum transmit power of the power station. If the maximum transmit power threshold of the power station increases, the time duration of energy harvesting becomes longer, because the longer the energy harvesting time, that is, the longer the stage $T_1$, the more backscatter signals the information receiver receive, and the more the energy is used for data transmission in the stage $T_2$, thereby further increasing the overall data rate.

FIG. 4 depicts a curve chart showing the relationship between the total data rate and the maximum transmit power of the power station. The total data rate increases as the maximum transmit power threshold of the power station increases. Compared with the other two algorithms, the algorithm of the present invention has the best performance, while the energy harvesting communication mode has the worst performance. Larger transmit power may be allocated to each subcarrier, and more energy may be harvested for data transmission in the stage $T_2$, thereby increasing the user rate.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A multi-carrier resource allocation method based on a wireless-powered backscatter communication network, comprising following steps:
   S1. constructing a wireless-powered backscatter communication system, including a backscatter transmitter, an information receiver and a power station, wherein the backscatter transmitter is provided with an energy harvesting module and a backscatter circuit;
   adopting a multi-carrier downlink transmission mode, and dividing a whole transmission process into two stages: in first stage, the power station transmits radio-frequency signals to the backscatter transmitter, and the backscatter transmitter reflects some signals and converts remaining radio-frequency signals into energy for storage; and in second stage, the backscatter transmitter uses harvested energy for data transmission and circuit power consumption;
   S2: according to minimum circuit power consumption constraints of the backscatter transmitter and maximum transmit power constraints of the power station, the backscatter transmitter establishes a resource allocation optimization problem taking a maximum highest possible transmission rate as an objective function;
   S3: according to the objective function and constraint conditions, decomposing an optimization sub-problem taking transmit power of the backscatter transmitter as a variable; this step is performed by the backscatter transmitter;
   S4: after substituting optimal transmit power of the backscatter transmitter into the resource allocation optimization problem in S2, decomposing a sub-problem taking an energy allocation coefficient optimization; this step is performed by the backscatter transmitter;
   S5: converting non-convex problems containing coupling variables into convex problems using a variable substitution method, creating a Lagrangian function using a Lagrange dual method, obtaining an optimal solution form according to Karush-Kuhn-Tucker (KKT) condition, and iteratively updating corresponding variables using a gradient descent method until convergence; this step is performed by the power station and the backscatter transmitter.

2. The multi-carrier resource allocation method based on a wireless-powered backscatter communication network according to claim 1, characterized in that step S1 comprises:

using $T_1$ and $T_2$ to represent time spent in the two stages of the transmission process, $T=T_1+T_2$ representing time required for the whole transmission process; dividing total system bandwidth B into K orthogonal subcarriers, so bandwidth of each subcarrier is $B_e=B/K$; defining a subcarrier set as $\forall k \in K=\{1, 2, \ldots, K\}$, assuming that each subcarrier experiences flat fading;

in the first stage $T_1$, the signals received by the backscatter transmitter are represented as:

$$y(t) = \sum_{k=1}^{K}\sqrt{p_k h_k}\, s_k(t) + n(t)$$

where $p_k$ represents transmit power allocated by the power station to the backscatter transmitter through subcarrier k, $h_k$ represents channel power gain from the power station to the backscatter transmitter, $s_k(t)$ represents transmit signals, n(t) represents a background noise and $n(t) \sim CN(0, \sigma^2)$;

dividing the signals received by the backscatter transmitter into two parts by a backscatter coefficient $\alpha$, where $\sqrt{\alpha}y(t)$ is used for data backscatter, and $\sqrt{1-\alpha}y(t)$ is used for energy harvesting; and in the stage $T_1$, the time used for energy harvesting is represented as $\tau$, $\xi \leq T_1$, and the harvested energy is represented as:

$$E = \tau\eta(1-\alpha)\sum_{k=1}^{K}p_k h_k$$

where $\eta \in [0,1]$ represents energy harvesting efficiency, and the harvested energy is used to support circuit power consumption and information transmission in the stage $T_2$;

assuming that the energy used for circuit power consumption is $(1-x)E$, the remaining energy $xE$ is used for information transmission, where x represents an energy allocation coefficient, thereby obtaining:

$(1-x)E \geq p_e T_1 + p_d T_2$ where $p_e$ and $p_d$ respectively represent circuit power consumption in the $T_1$ and $T_2$ time periods respectively, that is, the harvested energy used for circuit power consumption must be greater than or equal to total circuit power consumption in the $T_1$ and $T_2$ periods;

assuming that the backscatter transmitter can decode backscatter signals, defining the background noise power on each subcarrier as $\sigma_k = \sigma^2/K$, so backscatter data rate from the backscatter transmitter to the information receiver is $$R_b = T_1 \sum_{k=1}^{K} B_e \log_2\left(1 + \frac{\alpha p_k h_k g_k}{\sigma_k}\right)$$

where $g_k$ represents channel power gain from the backscatter transmitter to the information receiver, $B_e$ represents the bandwidth of each subcarrier, defining the transmit power of the backscatter transmitter on each subcarrier as $P_k$ in the stage $T_2$, so data rate of each subcarrier is $$R_k^h = B_e \kappa T_2 \log_2\left(1 + \frac{P_k g_k}{\sigma_k}\right)$$

where $\kappa \in [0,1]$ represents the transmission efficiency.

3. The multi-carrier resource allocation method based on a wireless-powered backscatter communication network according to claim 2, characterized in that in step S2, in order to improve transmission efficiency of the entire system, a maximum total transmission rate of the information receiver is obtained by jointly optimizing transmit power of the backscatter transmitter, the time allocation and the backscatter coefficient, and the resource allocation optimization problem is established as:

$$\max_{T_1,T_2,p_k,P_k,x,\tau,\alpha} R$$

s.t. $C1$: $(1-x)\tau\eta(1-\alpha)P_s \geq p_e T_1 + p_d T_2$, $C2$: $T_2 \sum_{k=1}^{K} P_k \leq x\tau\eta(1-\alpha)P_s$, $C3$: $T_1 + T_2 = T$, $C4$: $\sum_{k=1}^{K} p_k \leq P^{max}$, $C5$: $\tau \leq T_1$, $C6$: $0 \leq \alpha \leq 1$, $C7$: $0 \leq x \leq 1$, $C8$: $p_k \geq 0$, $P_k \geq 0$, $T_1 \geq 0$, $T_2 \geq 0$, $\tau \geq 0$.

where $P^{max}$ represents maximum transmit power of the power station, $$P_s = \sum_{k=1}^{K} p_k h_k$$

represents total power of the signals received by the backscatter transmitter, $$R = R_b + \sum_{k=1}^{K} R_k^h$$

represents the total data rate, C1 represents minimum circuit power consumption constraint, C2 represents maximum transmit power constraint of the backscatter transmitter in the stage $T_2$, and C4 represents the maximum transmit power constraint of the power station.

4. The multi-carrier resource allocation method based on a wireless-powered backscatter communication network according to claim 3, characterized in that in step S3, the transmit power $P_k$ of the backscatter transmitter is only restricted by C2, and an optimization sub-problem is decomposed and solved by using a water-filling algorithm, so the optimal $P^*_k$ is found first and is substituted into the optimization problem;

consider unit bandwidth over each subcarrier, an optimization sub-problem of the transmit power of the backscatter transmitter is written as:

$$\max_{P_k} T_2 \kappa \sum_{k=1}^{K} \log_2\left(1 + \frac{P_k g_k}{\sigma_k}\right)$$

$$\text{s.t. } C2: T_2 \sum_{k=1}^{K} P_k \leq x\tau\eta(1-\alpha)P_s.$$

the above problem is a convex optimization problem since the constraint condition is linear constraint and the objective function is a concave function; $\bar{g}_k = \sigma_k/g_k$ is defined, and the optimal transmit power obtained by using water-filling algorithm is $$P_k = \left[\frac{1}{\lambda \ln 2 T_2} - \bar{g}_k\right]^+$$

where $[x]^+ = \max(0, x)$, $\lambda$ represents a Lagrange multiplier, and $\lambda$ satisfies the following formula:

$$T_2 \sum_{k=1}^{K}\left(\frac{1}{\lambda \ln 2 T_2} - \bar{g}_k\right) = x\tau\eta(1-\alpha)P_s$$

$$\lambda = \frac{K}{\ln 2\left(T_2 \sum_{k=1}^{K} \bar{g}_k + x\tau\eta(1-\alpha)P_s\right)}$$

is obtained, and the transmit power $P_k$ is substituted, thus obtaining an optimal power allocation policy in the stage $T_2$:

$$P^*_k = \frac{\sum_{k=1}^{K} \bar{g}_k}{K} + \frac{x\tau\eta(1-\alpha)P_s}{KT_2} - \bar{g}_k$$

if more harvested energy is used for data transmission, the transmit power $P^*_k$ may be greater, and total data rate may be greater; if the transmit power $p_k$ of the power station becomes larger, $P^*_k$ also becomes larger; and since the backscatter transmitter has no energy storage device, the possible transmission rate of the backscatter transmitter is limited by the transmission power of the power station.

5. The multi-carrier resource allocation method based on a wireless-powered backscatter communication network according to claim 4, characterized in that in step S4, $P^*_k$ is substituted into the original optimization problem, and an optimization sub-problem with an energy coefficient is decomposed, $$\max_{x} T_1 \sum_{k=1}^{K} \log_2\left(1 + \frac{\alpha p_k h_k}{\bar{g}_k}\right) + T_2 \kappa \sum_{k=1}^{K} \log_2\left(\overline{K} + \frac{x\tau\eta(1-\alpha)P_s g_k}{\bar{g}_k KT_2}\right)$$

$$\text{s.t. } C1: (1-x)\tau\eta(1-\alpha)P_s \geq p_e T_1 + p_d T_2,$$

$$C7: 0 \leq x \leq 1.$$

where $$\overline{K} = \left(\sum_{k=1}^{K} g_j/g_k\right)$$

represents a constant, because the objective function of the above optimization sub-problem is a monotonically increasing function about the energy allocation coefficient x, according to the constraints C1 and C7, the value of x is $$x = \max\left(1, 1 - \frac{p_e T_1 + p_d T_2}{\tau\eta(1-\alpha)P_s}\right);$$

because the right side of the inequality of the constraint C1 is greater than zero, if x=1, the constraint condition is not satisfied, so the optimal energy allocation coefficient is $$x^* = 1 - \frac{p_e T_1 + p_d T_2}{\tau\eta(1-\alpha)P_s};$$

and because $x \geq 0$, the backscatter coefficient $\alpha$ must satisfy $$\alpha \leq 1 - \frac{p_e T_1 + p_d T_2}{\tau\eta P_s};$$

similarly, the optimal energy harvesting time $\tau^* = T_1 = T - T_2$ is obtained by using the same method.

6. The multi-carrier resource allocation method based on a wireless-powered backscatter communication network according to claim 5, characterized in that in step S5, x* and $\tau$* are substituted into the original optimization problem, thus obtaining following time and power allocation optimization problem:

$$\max_{T_1, T_2, p_k, \alpha, l_k} T_1 \sum_{k=1}^{K} \log_2\left(1 + \frac{\alpha p_k h_k}{\bar{g}_k}\right) + T_2 \kappa \sum_{k=1}^{K} \log_2(K + l_k)$$

$$\text{s.t. } C4: \sum_{k=1}^{K} p_k \leq P^{max},$$

$$C9: 0 \leq \alpha \leq 1 - B/A,$$

$$C10: \frac{A(1-\alpha) - B}{\bar{g}_k KT_2} \geq l_k.$$

where $l_k = \frac{x\tau\eta(1-\alpha)P_s}{\bar{g}_k KT_2}$, $l_k > 0$ is an auxiliary variable, which represent a lower bound of the second term of the objective function, $A=T_1\eta P_s$ represents an auxiliary variable; and $B=p_e T_1+p_d T_2$ represents the total circuit power consumption.

7. The multi-carrier resource allocation method based on a wireless-powered backscatter communication network according to claim 6, characterized in that $$\alpha \le 1 - \frac{B + \overline{g}_k K T_2 l_k}{A}$$

is obtained according to the constraint C10, so and C9 and C10 are combined into one constraint;

the variable substitution $L_k = T_2 l_k$, $\overline{p}_k = \alpha p_k$, $\tilde{p}_k = T_1 \overline{p}_k$, $\hat{p}_k = T_1 p_k$ is defined, substituted into the time and power allocation optimization problem, and converted into a convex optimization problem:

$$\max_{L_k, T_1, T_2, \tilde{p}_k, \hat{p}_k} T_1 \sum_{k=1}^{K} \log_2\left(1 + \frac{\tilde{p}_k h_k}{\overline{g}_k T_1}\right) + T_2 \kappa \sum_{k=1}^{K} \log_2\left(\overline{K} + \frac{L_k}{T_2}\right)$$

$$\text{s.t. } C4: \sum_{k=1}^{K} \hat{p}_k \le T_1 P^{max},$$

$$C10: \eta \sum_{k=1}^{K} \hat{p}_k h_k - \eta \sum_{k=1}^{K} \tilde{p}_k h_k \ge L_k \overline{g}_k K + p_e T_1 + p_d T_2.$$

8. The multi-carrier resource allocation method based on a wireless-powered backscatter communication network according to claim 7, characterized in that according to the described time and power allocation optimization problem, a Lagrangian function is created using a Lagrange dual method:

$$L(\{L_k\}, T_1, T_2, \{\tilde{p}_k\}, \{\hat{p}_k\}, \lambda, \{\beta_k\}) =$$

$$T_1 \sum_{k=1}^{K} \log_2\left(1 + \frac{\tilde{p}_k h_k}{\overline{g}_k T_1}\right) + T_2 \kappa \sum_{k=1}^{K} \log_2\left(\overline{K} + \frac{L_k}{T_2}\right) + \lambda\left(T_1 P^{max} - \sum_{k=1}^{K} \hat{p}_k\right) +$$

$$\sum_{k=1}^{K} \beta_k \left(\eta \sum_{k=1}^{K} \hat{p}_k h_k - \eta \sum_{k=1}^{K} \tilde{p}_k h_k - L_k \overline{g}_k K\right) - \sum_{k=1}^{K} \beta_k (T_2 p_d + T_1 p_e)$$

where $\beta_k$ and $\lambda$ represent non-negative Lagrange multipliers of corresponding constraints; the Lagrange function is rewritten as:

$$L(\{L_k\}, T_1, T_2, \{\tilde{p}_k\}, \{\hat{p}_k\}, \lambda, \{\beta_k\}) =$$

$$\sum_{k=1}^{K} L_k(\{L_k\}, T_1, T_2, \{\tilde{p}_k\}, \{\hat{p}_k\}, \lambda, \{\beta_k\}) \text{ where}$$

$$L_k(\{L_k\}, T_1, T_2, \{\tilde{p}_k\}, \{\hat{p}_k\}, \lambda, \{\beta_k\}) =$$

$$T_1 \log_2\left(1 + \frac{\tilde{p}_k h_k}{\overline{g}_k T_1}\right) + T_2 \kappa \log_2\left(\overline{K} + \frac{L_k}{T_2}\right) - \lambda \hat{p}_k -$$

$$\beta_k(T_2 p_d + T_1 p_e) + \beta_k\left(\eta \sum_{k=1}^{K} \hat{p}_k h_k - \eta \sum_{k=1}^{K} \tilde{p}_k h_k - L_k \overline{g}_k K\right) + \frac{\lambda T_1 P^{max}}{K}$$

according to Karush-Kuhn-Tucker condition, optimal solutions are $$\tilde{p}_k^* = T_1\left[\frac{1}{\ln 2 \beta_k \eta h_k} - \frac{\overline{g}_k}{h_k}\right]^+, L_k^* = T_2\left[\frac{\kappa}{\ln 2 \beta_k \overline{g}_k K} - \overline{K}\right],$$

where $[x]^+ = \max(0, x)$; $\tilde{p}^*_k$ and $L^*_k$ are substituted into the above Lagrange function, obtaining:

$$\overline{L}_k(T_2\{\hat{p}_k\}, \lambda, \{\beta_k\}) = -(T - T_2)\log(\ln 2\eta \beta_k \overline{g}_k) +$$

$$T_2 \kappa \log_2\left(\frac{\kappa}{\ln 2 \beta_k \overline{g}_k K}\right) - \lambda \hat{p}_k - \beta_k(T_2 p_d + (T - T_2) p_e) + \frac{\lambda(T - T_2) P^{max}}{K} -$$

$$(T - T_2)\left(\frac{K}{\ln 2} - \eta \sum_{k=1}^{K} \beta_k \overline{g}_k\right) - \frac{T_2 \kappa}{\ln 2} + T_2 \beta_k \overline{g}_k K\overline{K} + \beta_k \eta \sum_{k=1}^{K} \hat{p}_k h_k$$

based on the gradient descent method, the parameters are iteratively updated, including $$T_2(t+1) = \left[T_2(t) - \Delta_T \times \frac{\partial \overline{L}_k}{\partial T_2}\right]^+, T_1(t) = T - T_2(t) \text{ and}$$

$$\hat{p}_k(t+1) = \left[\hat{p}_k(t) - \Delta_p \times \frac{\partial \overline{L}_k}{\partial \hat{p}_k}\right]^+, \text{ where}$$

$$\frac{\partial \overline{L}_k}{\partial \hat{p}_k} = \beta_k \eta h_k - \lambda,$$

$$\frac{\partial \overline{L}_k}{\partial T_2} = \log_2(\ln 2\eta\beta_k \overline{g}_k) + \kappa \log_2\left(\frac{\kappa}{K \ln 2 \beta_k \overline{g}_k}\right) -$$

$$\beta_k p_d + \beta_k p_e - \frac{\lambda P^{max}}{K} - \frac{\kappa}{\ln 2} + \beta_k K\overline{K}\overline{g}_k + \frac{K}{\ln 2} - \eta \sum_{k=1}^{K} \beta_k \overline{g}_k \ t$$

represents iteration times, and $\Delta_p$ and $\Delta_T$ represent corresponding iteration step sizes; similarly, Lagrange multipliers $\beta_k$ and $\lambda$ are updated by using the same method until convergence; according to the relationship between variables defined by the variable substitution, the optimal value $$\alpha^* = \frac{\tilde{p}_k^*}{\hat{p}_k^*}$$

of the backscatter coefficient and the optimal power allocation policy $$p_k^* = \frac{\hat{p}_k^*}{T_1^* \alpha^*}$$

from the power station to the backscatter transmitter are solved; and $p^*_k$, $\alpha^*$, $T^*_1$, $T^*_2$ and $\tau^*$ are substituted into the previous derivation of the energy allocation coefficient and the transmit power of the backscatter transmitter to obtain $x^*$ and $P^*_k$.

* * * * *